United States Patent [19]

Lemaçon

[11] Patent Number: 5,052,639
[45] Date of Patent: Oct. 1, 1991

[54] DEVICE FOR MAINTAINING A LOAD ATTACHED TO AN AIRCRAFT INCLUDING A LOAD CONTACTING MEANS AND A SEPARATE LOAD PRESTRESSING MEANS

[75] Inventor: Jacques Lemaçcon, Arcachon, France

[73] Assignee: Avions Marcel Dassault-Breguet Aviation, Vaucresson, France

[21] Appl. No.: 493,767

[22] Filed: Mar. 15, 1990

[30] Foreign Application Priority Data

Mar. 28, 1989 [FR] France ............................ 89 03984

[51] Int. Cl.$^5$ ................................................ B64D 1/12
[52] U.S. Cl. ................................ 244/137.4; 89/1.54; 89/1.53; 294/82.26
[58] Field of Search ............ 244/137.4; 89/1.54, 89/1.53, 1.58, 1.59, 1.51; 294/82.26

[56] References Cited

U.S. PATENT DOCUMENTS

| | | | |
|---|---|---|---|
| 2,552,578 | 5/1951 | O'mara | 89/1.53 |
| 4,168,046 | 9/1979 | Hasquenoph et al. | |
| 4,196,879 | 4/1980 | Craigie | 244/137.4 |
| 4,318,561 | 3/1982 | Hasquenoph et al. | 89/1.58 |
| 4,346,642 | 8/1982 | Uhle | |
| 4,441,674 | 4/1984 | Holtrop | |
| 4,669,356 | 1/1987 | Griffin et al. | 244/137.4 |

FOREIGN PATENT DOCUMENTS

| | | | |
|---|---|---|---|
| 0016325 | 10/1980 | European Pat. Off. | |
| 3403758 | 8/1985 | Fed. Rep. of Germany | 244/137.4 |
| 2376026 | 7/1978 | France | |

Primary Examiner—Joseph F. Peters, Jr.
Assistant Examiner—Christopher P. Ellis
Attorney, Agent, or Firm—Stevens, Davis, Miller & Mosher

[57] ABSTRACT

Device for maintaining a load attached to an aircraft immobilized in relation to the said aircraft, comprising bearing members carried by the aircraft and movable relative to the aircraft, means provided for moving the bearing members into contact with the said load, and a jack separate from the said means and having a movable assembly which is capable of exerting a force on the bearing members in order to clamp them firmly against the load.

5 Claims, 3 Drawing Sheets

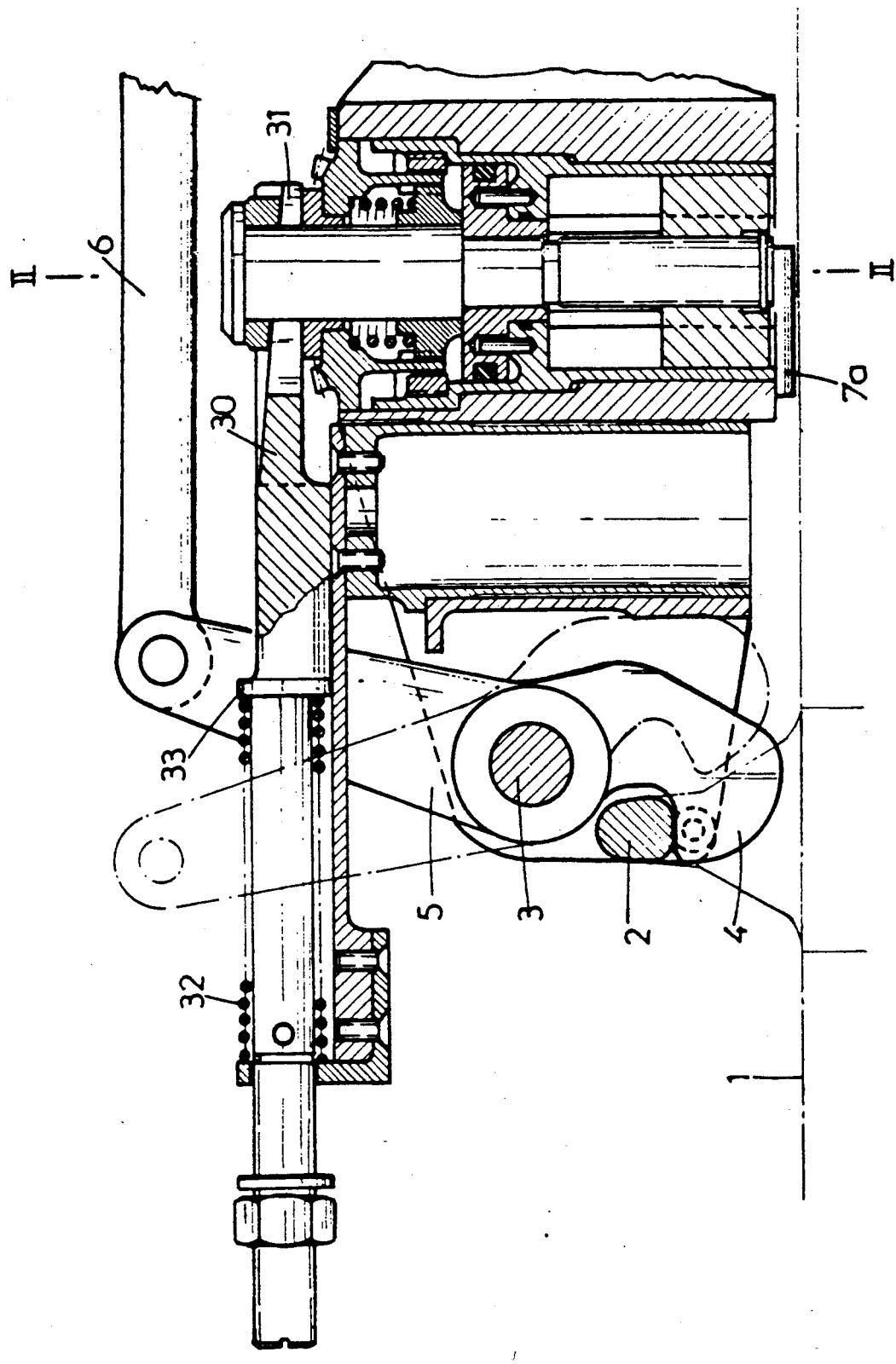

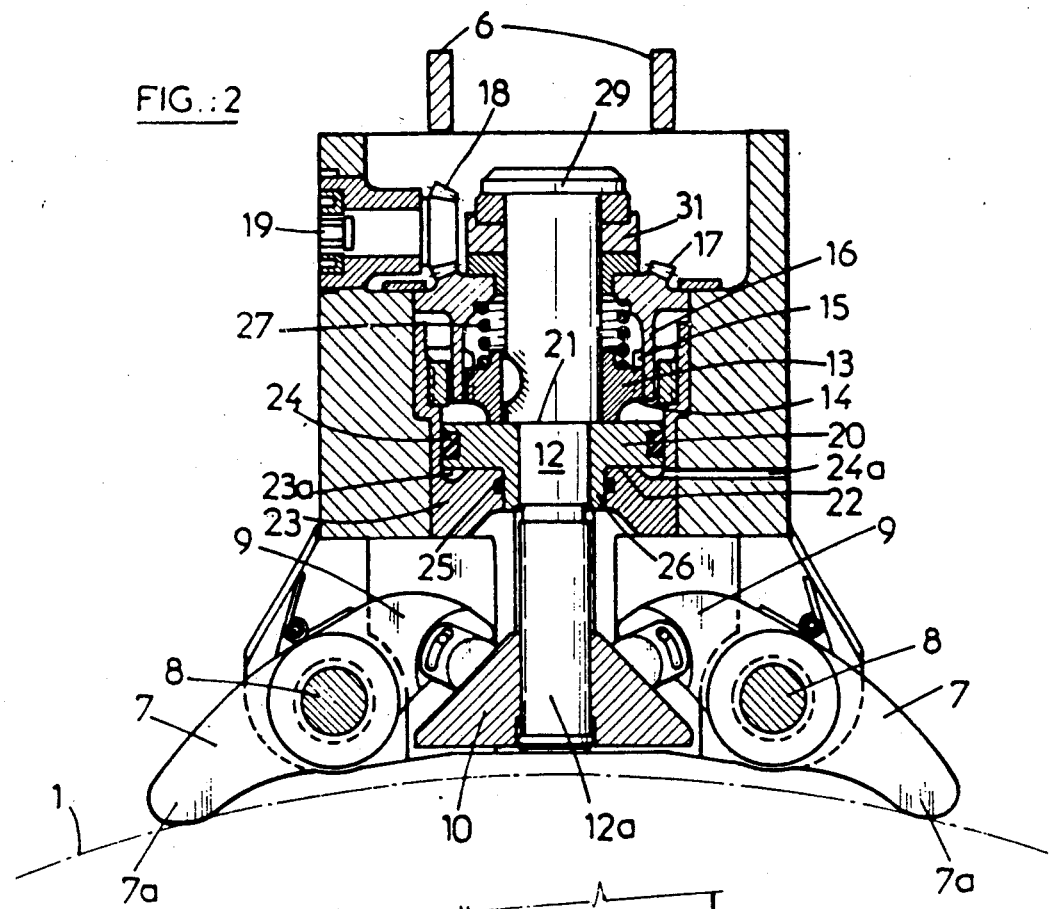
FIG.:2
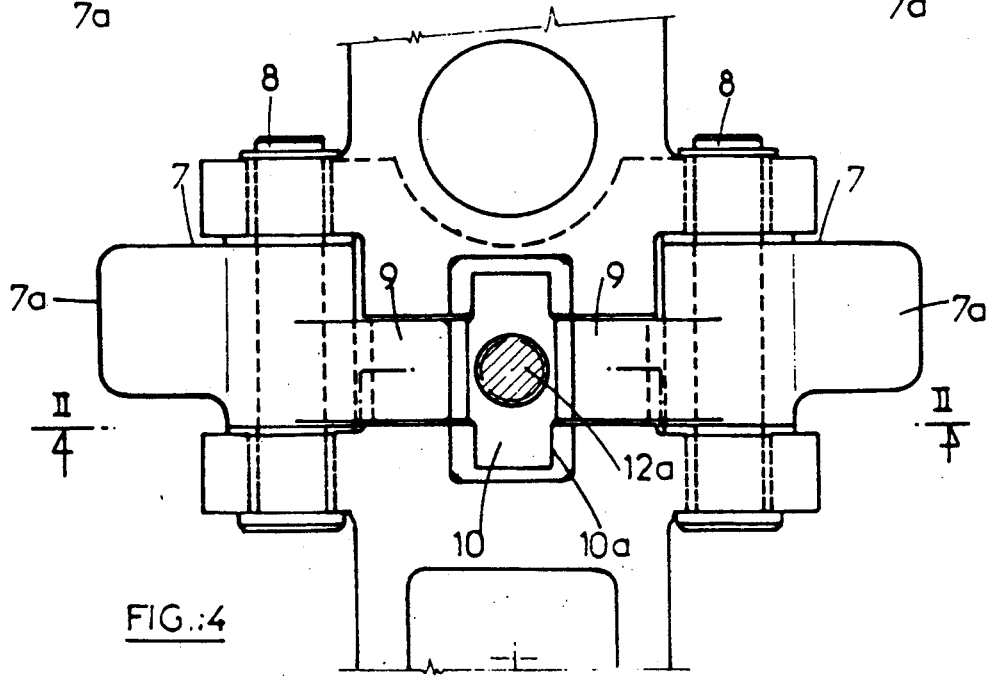
FIG.:4

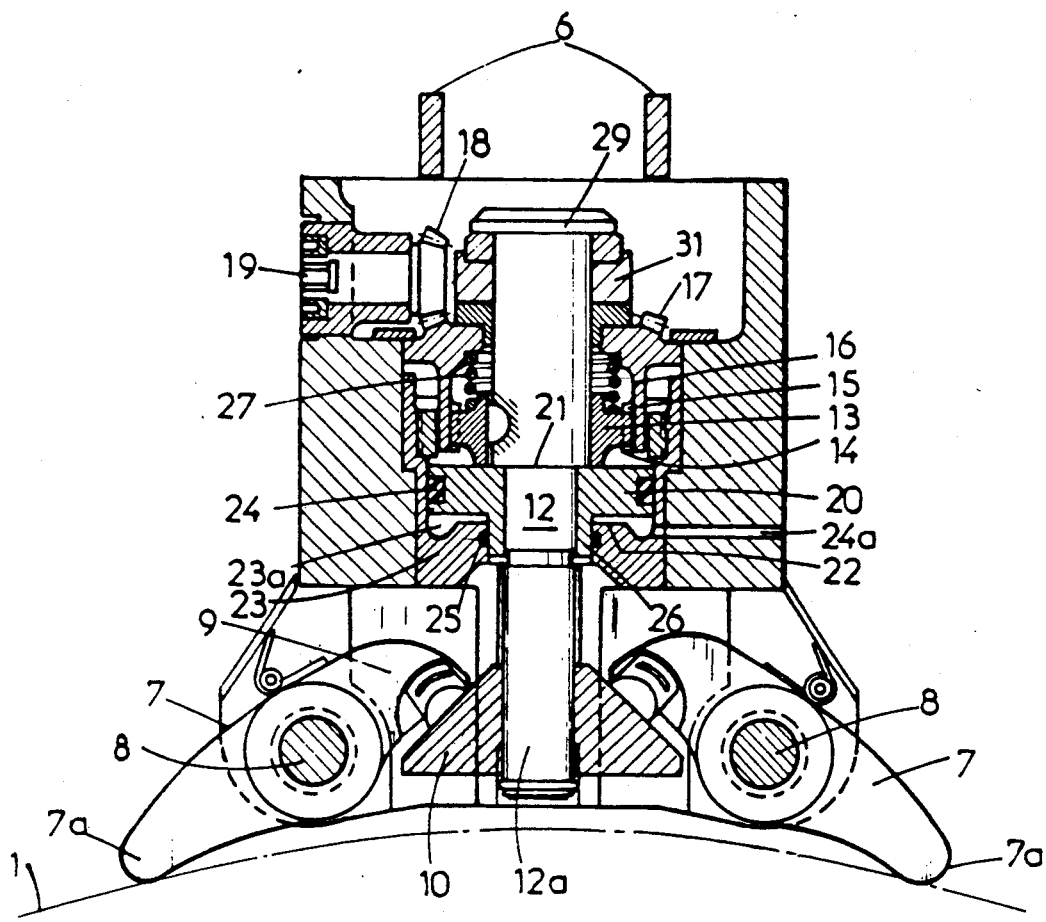
FIG.: 3

DEVICE FOR MAINTAINING A LOAD ATTACHED TO AN AIRCRAFT INCLUDING A LOAD CONTACTING MEANS AND A SEPARATE LOAD PRESTRESSING MEANS

BACKGROUND OF THE INVENTION

The present invention relates to a device for maintaining a load attached to an aircraft.

Military aircraft or those used for military purposes frequently carry external loads, usually arms and especially bombs.

They are carried under the fuselage or under the wings where they are attached to built-on elements called masts or beams.

These masts are rigid structures of elongate form which on the one hand are fastened to the aircraft and on the other hand carry, in their lower part, more or less complex mechanisms intended for attaching the load or loads. Most often, these loads, for example bombs, have in their upper part one or two rings for ensuring their fastening.

The connection to the mast is made as follows:

on the mast there are articulated hooks which take up the rings of the load in order to suspend the latter on the mast, in order to immobilize the load attached in this way, the latter is clamped firmly on bearing pieces which project on each side of the mast in the vicinity of the hooks.

In fact, during the movement of the aircraft in flight, it is essential that the load should form a single unit with the mast and that the forces which it undergoes do not bring about a relative movement between it and the mast. It is therefore necessary to generate sufficient stresses in the region of the bearings to ensure that the load is effectively immobilized.

Conventionally, the fastening of the load is carried out by means of a mechanical control actuated manually. In contrast, the flight jettisoning mechanism is actuated by means of compressed gases generated either by the combustion of a small powder charge or as a result of the opening of a reserve (for example, compressed-gas bottle). The advantage of the latter solution is that it does not pollute the circuits in which the gas circulates, this being very important to the user for the maintenance of the circuits.

As regards putting the load under stress by means of the pieces provided for this purpose, this can be carried out in various ways:

a movement of the fastening system, the bearings being stationary pieces, the use of screws passing through the bearing pieces and coming to bear on the load (called set screws), movable bearings actuated by means of a specific mechanism.

In these various instances, the maneuver is carried out by means of a mechanism set in motion manually by the use of suitable tools.

The operation of bringing to bear takes place in two stages:

the load is brought into contact with the bearings, without exerting any appreciable force in the region of the bearing zone, a so-called "prestressing" force is then exerted by applying a torque of given value to the mechanism or by causing the rotary pieces transmitting the torques to execute a specific number of revolutions.

According to patents HOLTROP U.S. Pat. No. 4,441,674 and Hasquenoph, a jack, U.S. Pat. No. 4,168,046, the movable assembly of which is actuated by means of a fluid under pressure, is used in order to carry out the bringing into contact with the bearings and the prestressing.

The disadvantage of this arrangement is that the same member is used for two different operations, the first requiring a low force and a high movement capability and the second requiring a high force for a reduced movement. This results in an excessive weight and cost.

The object of the invention is to provide a device which is simpler and lighter, while at the same time affording the same safety as prior devices.

SUMMARY OF THE INVENTION

The invention provides a device for maintaining a load attached to an aircraft immobilized in relation to the said aircraft, comprising bearing members carried by the aircraft and movable relative to the aircraft, means provided for moving the bearing members into contact with the said load, and a jack separate from the said means and having a movable assembly which is capable of exerting a force on the bearing members in order to clamp them firmly against the load.

It is possible to differentiate between the effective means for the two phases defined above by retaining a mechanical control for the first phase, pneumatic energy being used only for the second phase.

Since this operation is carried out only when the aircraft is on the ground, it is possible to consider using an external pneumatic source. The advantage of this is that there is no consumption of any of the gas stored in the reserve installed in the mast and also that the gas distribution system in the mast is simplified.

It was seen above that the bringing to bear makes it necessary to move sets of pieces. These movements will therefore take place under the action of jacks. The fluid injected into the jacks can either be directly compressed gas (in reserve in the mast or coming from an external source) or be an intermediate fluid (gas or liquid) which would itself be set in motion by means of the primary pneumatic source.

Since it is not desirable to keep the jack or jacks permanently under pressure in order to maintain the prestress, a mechanical system automatically blocks the jacks in the prestressing position, thus making it possible to lower the internal pressure of the fluid introduced into the jack, while at the same time guaranteeing the exerted prestress, until the load is jettisoned.

When a load has to be reattached, in some cases the system for blocking the jacks will have to be released beforehand, so that the attachment cycle described above can be repeated.

This operation can be carried out either mechanically or pneumatically.

The following description, with reference to the accompanying drawing given by way of non-limiting example, will make it easy to understand how the invention can be put into practice, the particular features emerging both from the text and from the drawing of course forming part of the said invention.

BRIEF DESCRIPTION OF THE DRAWING

FIG. 1 is an axial vertical section through half of an improved load-attaching device according to the invention.

FIGS. 2 and 3 show, in cross-section according to line II—II on FIG. 1, the position of the members before and after prestressing as a result of pneumatic action.

FIG. 4 is a view in horizontal projection.

DETAILED DESCRIPTION OF ONE EMBODIMENT OF THE INVENTION

In FIG. 1, the dot-and-dash line 1 represents part of the apparent upper contour of a load, such as a bomb, to be attached under the aircraft. This load, which has the general form of a body of revolution, has its axis parallel to FIG. 1, but a little lower in the plane of the figure.

Strong rings, such as 2, are fastened to this load and between them have a spacing equal to that of the axles, such as 3, which are perpendicular relative to the plane of FIG. 1 and about which hooks, such as 4, which are identical and oriented in the same way, can pivot.

The position of these hooks which is represented by an unbroken line is that in which the hooks, engaged in the rings 2, retain the load which is thereby suspended from the aircraft.

On the contrary, the position of the hooks represented by dot-and-dash lines is that in which the hooks, freed from the rings 2, release the load which is thereby jettisoned. The hooks are fixed to levers, such as 5, which are connected to one another by means of a link 6 synchronizing their movement for both the attachment and the jettisoning of the load.

To prevent any movement of the load while the aircraft is in motion, the load is blocked as a result of a so-called "prestressing" force by means of the device which will now be described Located between two successive hooks is a pair of levers 7, each of which can pivot about an axle 8 parallel to the axis of the load.

The projecting end 7a of each of these levers, which is intended to come to bear forcibly on the load, has a cylindrical form. Each of the levers has a heel 9, and located between the heels is a wedge-shaped piece 10, the slopes 11 of which interact with the heels 9, in such a way that during the movement of the piece 10 upwards in FIGS. 2 or 3, the heels 9, moved away from one another by the slopes 11, bring the ends 7a of the levers 7 to bear firmly against the load. The levers consequently tend to push the load away, the effect of this being to press the rings 2 firmly onto the noses of the hooks 4, the load thereby being immobilized. The prestressing force exerted on the load must be sufficiently high to allow for the accelerations to which the load is subjected during the movements of the aircraft.

The piece 10 of rectangular form, as seen in a plan view (FIG. 4), is internally threaded, and its threads interact with the threaded end 12a of a rod 12, as would those of a nut. The piece 10 is moreover guided in a well 10a of rectangular cross-section of the housing. The rod 12 is fixed to a small gearwheel 13, the teeth 14 of which are in engagement with the internal toothing 15 of a sleeve 16. The latter has a conical toothing 17 in engagement with a conical pinion 18, the axle of which is equipped with a connector 19, to which a hand tool or motor-driven tool can be coupled in order to set in rotation the system consisting of the pinion 18, the sleeve 16 with its toothings 17 and 15, the wheel 13 and the rod 12, this system being generally designated as jack J, see FIG. 2. During a suitably directed rotation of the rod 12, the wedge-shaped piece 10 is moved upwards in FIGS. 2 and 3, in such a way that, by pushing on the heels 9, this piece 10 brings the levers 7 to bear on the load.

To obtain a high prestressing force, the rod 12 is associated with a piston 20 which, at rest (the position of FIG. 2), is clamped between a shoulder 21 of the rod 12 and a bearing rest 22 of the housing 23 containing the device. Underneath the piston is an annular recess 23a which can be fed with compressed gas by way of a duct 24a. The piston 20 carries a gasket 24 on its periphery, and another gasket 25 is provided between the housing 23 and the collar 26 forming the piston rod.

After the levers 7 have been brought to bear on the load by means of the process already described, when compressed gas is supplied at 23 the piston and the rod 12 are lifted and the piece 10 transmits to the levers 7 a force bearing on the load which is a function of the pressure of the gas and of the surface of the piston. The vertical movement of the rod 12 takes place counter to the force of a return spring 27.

It will be seen that the rod 12, at its top, carries a shoulder 29, under which is engaged a lock 30, (see FIG. 1) the end 31 of which has the form of a fork straddling the rod 12. When the rod is lifted as a result of the action of the piston 20, a spring 32 pushing on a shoulder 33 of the lock moves the latter to the right in FIG. 1, thus blocking the rod in the position given to it by the piston, thus making it possible to cancel the pressure of the compressed gas on this piston, while at the same time maintaining the device in the prestressing position.

I claim:

1. A device for maintaining a load which is attached to an aircraft and stationary in relation to the said aircraft, said device comprising bearing members carried by the aircraft and movable relative to the aircraft, and a) an externally operated rotary mechanical first means for moving the bearing members into contact with the said load, said means being able to provide a low force and a high movement capability to said bearing members, and b) separate second means for prestressing said bearing members comprising a pressurized fluid actuated cylinder and piston unit having a movable assembly for exerting a prestressing force on the bearing members in order to clamp them firmly against the load.

2. Device according to claim 1 wherein the bearing members comprise levers articulated on pivots fixed relative to the aircraft, each said lever having a load contacting surface on one end and a heel at the opposite end, said first means for moving the bearing members in contact with the load comprises a wedge-shaped piece having slopes positioned for interacting with the heel of the lever and a threaded rod for driving said wedge shaped piece and gears for rotating said threaded rod.

3. Device according to claim 2, wherein the cylinder-piston unit is mounted on the said rod.

4. Device according to claim 2, further comprising a lock interacting with the said rod in order to block said rod in its prestressing position.

5. Device according to claim 4 wherein said lock comprises said roll having a shoulder, a fork shaped piece having an end which engages said shoulder and spring means for biasing said fork-shaped piece toward engagement with said shoulder.

* * * * *